(12) United States Patent
Gulwani et al.

(10) Patent No.: US 8,650,207 B2
(45) Date of Patent: Feb. 11, 2014

(54) INDUCTIVE SYNTHESIS OF TABLE-BASED STRING TRANSFORMATIONS

(75) Inventors: Sumit Gulwani, Redmond, WA (US); Rishabh Singh, Cambridge, MA (US); Dany Rouhana, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 81 days.

(21) Appl. No.: 13/310,238

(22) Filed: Dec. 2, 2011

(65) Prior Publication Data

US 2013/0144902 A1   Jun. 6, 2013

(51) Int. Cl.
*G06F 17/30* (2006.01)
*G06F 7/00* (2006.01)

(52) U.S. Cl.
USPC ........................................ 707/769; 707/771

(58) Field of Classification Search
USPC .......................................................... 707/769
See application file for complete search history.

(56) References Cited

U.S. PATENT DOCUMENTS

| | | | | |
|---|---|---|---|---|
| 6,530,028 | B1* | 3/2003 | Yokoyama | 713/330 |
| 6,560,616 | B1* | 5/2003 | Garber | 1/1 |
| 6,721,715 | B2* | 4/2004 | Nemzow | 705/35 |
| 6,820,135 | B1 | 11/2004 | Dingman et al. | |
| 7,284,196 | B2 | 10/2007 | Skeen et al. | |
| 2001/0011241 | A1* | 8/2001 | Nemzow | 705/35 |
| 2004/0205549 | A1* | 10/2004 | Yassin et al. | 715/513 |
| 2007/0055966 | A1 | 3/2007 | Waddington et al. | |
| 2007/0150513 | A1* | 6/2007 | Vanden Heuvel et al. | 707/104.1 |
| 2009/0119416 | A1* | 5/2009 | Sirdevan et al. | 709/246 |
| 2009/0210418 | A1* | 8/2009 | Arasu et al. | 707/6 |
| 2009/0240726 | A1 | 9/2009 | Carter et al. | |
| 2010/0211580 | A1 | 8/2010 | Sreekanth | |
| 2011/0038531 | A1* | 2/2011 | Arasu et al. | 382/155 |
| 2011/0184854 | A1* | 7/2011 | Beck et al. | 705/39 |
| 2011/0295937 | A1* | 12/2011 | Howard et al. | 709/203 |
| 2011/0302553 | A1* | 12/2011 | Gulwani | 717/107 |
| 2012/0011084 | A1* | 1/2012 | Gulwani et al. | 706/12 |
| 2012/0011152 | A1* | 1/2012 | Gulwani et al. | 707/771 |

OTHER PUBLICATIONS

Satta, G., J. C. Henderson, String transformation learning, Proc. of the 35th Annual Meeting of the Association for Computational Linguistics, Jul. 1997, pp. 444-451.

Spencer, B., S. Liu, Inferring data transformation rules to integrate semantic web services, Third Int'l Semantic Web Conf., Nov. 2004, pp. 456-470, Hiroshima, Japan.

Cousot, P., R. Cousot, Systematic design of program analysis frameworks, Conf. Record of the Sixth Annual ACM Symposium on Principles of Programming Languages, Jan. 1979, pp. 269-282, San Antonio, Texas.

(Continued)

*Primary Examiner* — Binh V Ho
(74) *Attorney, Agent, or Firm* — Dan Choi; Carole Boelitz; Micky Minhas

(57) ABSTRACT

Inductive synthesis and combination framework technique embodiments are presented that generally perform string transformations involving lookup operations in one or more relational tables, either alone or in combination with other non-lookup operations. More particularly, a semantic string lookup transformation language is presented, which can be used to generate an inductive synthesis procedure that synthesizes a set of transformations involving lookup operations that are consistent with the given set of input-output examples. In addition, a combination framework for combining the lookup transformation language and its synthesis procedure, with other transformation languages and their associated synthesis procedures, is presented. The resulting combined synthesis procedures enable the combination framework to synthesize transformations on a rich variety of data-types.

20 Claims, 7 Drawing Sheets

(56) References Cited

OTHER PUBLICATIONS

Sarma, A. D., A. G. Parameswaran, H. Garcia-Molina, J. Widom, Synthesizing view definitions from data, Proc. of the 13th Int'l Conf. on Database Theory, Mar. 23-25, 2010, pp. 89-103, Lausanne, Switzerland.

Fisher, K., R. Gruber, PADS: A domain-specific language for processing ad hoc data, Proc. of the ACM SIGPLAN 2005 Conf. on Programming Language Design and Implementation, Jun. 2005, pp. 295-304, Chicago, IL, USA.

Fisher, K., Y. Mandelbaum, D. Walker, The next 700 data description languages, Conf. Record of the 33rd ACM SIGPLAN-SIGACT Symposium on Principles of Programming Languages, Jan. 2006, pp. 2-15.

Fisher, K., D. Walker, K. Q. Zhu, P. White, From dirt to shovels: Fully automatic tool generation from ad hoc data, Proc. of the 35th ACM SIGPLAN-SIGACT Symposium on Principles of Programming Languages, Jan. 7-12, 2008, pp. 421-434, San Francisco, California, USA.

Gulwani, S., Dimensions in program synthesis, Proc. of the 12th Int'l ACM SIGPLAN Symposium on Principles and Practice of Declarative Programming, Jul. 2010, pp. 13-24.

Gulwani, S., Automating string processing in spreadsheets using input-output examples, Proc. of the 38th ACM SIGPLAN-SIGACT Symposium on Principles of Programming Languages, Jan. 2011, pp. 317-330, Austin, TX, USA.

Gulwani, S., A. Tiwari, Combining abstract interpreters, Proc. of the ACM SIGPLAN 2006 Conf. on Programming Language Design and Implementation, Jun. 2006, pp. 376-386, Ottawa, Ontario, Canada.

Harris, W. R., S. Gulwani, Spreadsheet table transformations from examples, Proc. of the 32nd ACM SIGPLAN Conf. on Programming Language Design and Implementation, Jun. 2011, pp. 317-328, San Jose, CA, USA.

Kuncak, V., M. Mayer; R. Piskac, P. Suter, Complete functional synthesis, Proc. of the 2010 ACM SIGPLAN Conf. on Programming Language Design and Implementation, Jun. 2010, pp. 316-329, Toronto, Ontario, Canada.

Lau, Tessa, Why PBD systems fail: Lessons learned for usable AI, CHI Workshop on Usable AI, Apr. 5-Apr. 10, 2008.

Lau, T. A., S. A. Wolfman, P. Domingos, D. S. Weld, Programming by demonstration using version space algebra, Machine Learning, Oct.-Nov. 2003, vol. 53, No. 1-2, pp. 111-156.

Lerner, S., D. Grove, C. Chambers, Composing dataflow analyses and transformations, The 29th SIGPLAN-SIGACT Symposium on Principles of Programming Languages, Jan. 2002, pp. 270-282, Portland.

Miller, R. C., B. A. Myers, Interactive simultaneous editing of multiple text regions, Proc. of the General Track: 2001 USENIX Annual Technical Conf., Jun. 2001, pp. 161-174, Boston, Massachusetts, USA.

Nelson, G., D. C. Oppen, Simplification by cooperating decision procedures, ACM Trans. Program. Lang. Syst., vol. 1, No. 2, Jul. 1979, pp. 245-257.

Solar-Lezama, A., G. Arnold, L. Tancau, R. Bodík, V. A. Saraswat, S. A. Seshia, Sketching stencils, Proc. of the ACM SIGPLAN 2007 Conf. on Programming Language Design and Implementation, Jun. 2007, pp. 167-178, San Diego, California, USA.

Srivastava, S., S. Gulwani, J. S. Foster, From program verification to program synthesis, Proc. of the 37th ACM SIGPLAN-SIGACT Symposium on Principles of Programming Languages, pp. 313-326, Jan. 2010, Madrid, Spain.

Tran, Q. T., C.-Y. Chan, S. Parthasarathy, Query by output, Proc. of the ACM SIGMOD Int'l Conf. on Management of Data, Jun. 29-Jul. 2, 2009, pp. 535-548, Providence, Rhode Island, USA.

Xi, Q., D. Walker, A context-free markup language for semi-structured text, Proc. of the 2010 ACM SIGPLAN Conf. on Programming Language Design and Implementation, Jun. 2010, pp. 221-232, Toronto, Ontario, Canada.

Nix, R. P., Editing by example, ACM Transactions on Programming Languages and Systems (TOPLAS), Oct. 1985, vol. 7, No. 4, pp. 600-621, ACM New York, NY, USA.

\* cited by examiner

| Input $v_1$ | Input $v_2$ | Output |
|---|---|---|
| Stroller | 12/10/2010 | $145.67 |
| Bib | 5/23/2010 | $3.56 |
| Diapers | 1/21/2011 | $21.45 |
| Wipes | 4/2/2009 | $5.12 |
| Aspirator | 2/23/2010 | $2.56 |

FIG. 4

| MarkupRec | | |
|---|---|---|
| Item-Id | Item-Name | Markup |
| ST-340 | Stroller | 30% |
| BI-567 | Bib | 40% |
| DI-328 | Diapers | 35% |
| WI-989 | Wipes | 40% |
| AS-469 | Aspirator | 45% |
| ... | ... | ... |

FIG. 5

| CostRec | | |
|---|---|---|
| Item-Id | Date | Cost |
| ST-340 | 12/10/2010 | $145.67 |
| ST-340 | 12/5/2010 | $142.38 |
| BI-567 | 5/23/2010 | $3.56 |
| DI-328 | 1/21/2011 | $21.45 |
| WI-989 | 4/2/2009 | $5.12 |
| AS-469 | 2/23/2010 | $2.56 |
| ... | ... | ... |

FIG. 6

| | 802 | 804 | 806 | 812 |
|---|---|---|---|---|
| | ↓ | ↓ | ↓ | ↓ |
| | Input $v_1$ | Input $v_2$ | Input $v_3$ | Output |
| 808 → | 10 USD | EUR | 2010-05-24 | 0.82 * 10 |
| 810 → | 20 USD | EUR | 2010-05-26 | 0.81 * 20 |
| | 21 CHF | EUR | 2010-06-03 | **0.71 * 21** |
| | 52 EUR | USD | 2010-06-17 | **1.23 * 52** |
| | 25 EUR | USD | 2010-06-20 | **1.24 * 25** |
| | 80 EUR | INR | 2010-08-20 | **59.52 * 80** |

| CurrTab | | | |
|---|---|---|---|
| Src | Date | Dst | ExRate |
| USD | 2010-05-24 | EUR | 0.8202 |
| USD | 2010-05-24 | INR | 46.9846 |
| USD | 2010-05-26 | EUR | 0.8124 |
| EUR | 2010-06-20 | USD | 1.2372 |
| ... | ... | ... | ... |

FIG. 9

INDUCTIVE SYNTHESIS OF TABLE-BASED STRING TRANSFORMATIONS

BACKGROUND

Millions of people worldwide use spreadsheets, and the like, for storing and manipulating data. These data manipulation scenarios often involve converting a large quantity of input information from one format to another format, or entail performing computations on the input information to produce a desired output. Typically, these tasks are accomplished manually or with the use of small, often one-off, applications that are either created by the end-user or by a programmer for the end-user.

SUMMARY

Inductive synthesis and combination framework technique embodiments described herein generally perform string transformations involving lookup operations in one or more relational tables, either alone or in combination with other non-lookup operations. In one exemplary embodiment where the lookup table string transformations are employed alone, a relational table lookup expression language is established which includes a set of grammar rules defining expressions therein. A synthesis procedure is then generated that learns a set of expressions in the relational table lookup expression language. These learned expressions produce a prescribed output from one or more input string variables using the aforementioned relational table or tables, and are derived using a set of one or more input-output examples. Each input-output example includes one or more input string variables and the prescribed output. Once the synthesis procedure is generated, one or more input string variables of a same type found in the set of input-output examples is received, and the prescribed output is produced using the synthesis procedure.

In an exemplary embodiment where the lookup table string transformations are employed in combination with other non-lookup operations, the aforementioned relational table lookup expression language is accessed. In addition, a second expression language associated with string transformations that do not involve lookup operations in a relational table is accessed. Like the relational table lookup expression language, the second expression language includes a set of grammar rules defining expressions therein. The relational table lookup expression language and the second expression language are then combined to establish a combined expression language. A synthesis procedure that learns a set of expressions in the combined expression language is generated. These learned expressions produce a prescribed output from one or more input string variables using lookup operations and non-lookup operations, and is based on a set of one or more input-output examples. As before, each input-output example includes one or more input string variables and the prescribed output. Once the synthesis procedure is generated, one or more input string variables of a same type found in the set of input-output examples is received, and the prescribed output is produced using the synthesis procedure.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

FIG. 4 is a table depicting a spreadsheet having input columns representing an item name and date, and an output column representing a monetary value of the specified item on the specified date.

FIG. 5 is a relational lookup table entitled MarkupRec that stores an item's name with its corresponding item-id and markup percentage.

FIG. 6 is a relational lookup table entitled CostRec that stores the price of an item with its corresponding item-id and the date the item had the specified price.

FIG. 8 is a table depicting a spreadsheet having input columns representing the amount and type of currency to be converted (source currency), the type of currency the input amount is being converted to (destination currency), and the date of conversion; and an output column representing the conversion rate existing on the specified input date rounded to two decimal places and the number of dollars or other currency specified in the input, separated by the symbol "*".

FIG. 9 is a relational lookup table entitled CurrTab that stores an exchange rate with its corresponding source and destination currency, and the date the exchange rate was applicable.

DETAILED DESCRIPTION

Figure 1:
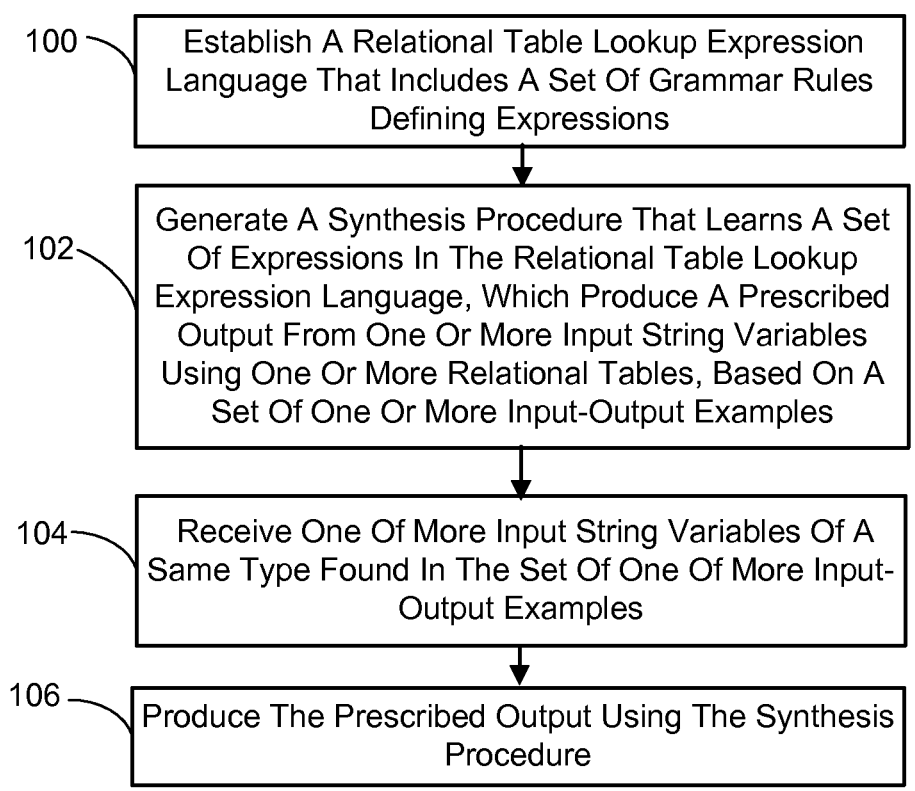
FIG. 1 is a flow diagram generally outlining one embodiment of a process for establishing a semantic string lookup transformation language and generating an inductive synthesis procedure that synthesizes a set of transformations involving lookup operations that are consistent with the given set of input-output examples.

In the following description of inductive synthesis and combination framework technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Inductive Synthesis and Combination Framework

In general, the inductive synthesis and combination framework technique embodiments described herein involve performing semantic transformations on strings, and more particularly, transformations on strings involving lookup in relational tables and transformations on strings representing one or more other data-types in addition to relational table lookups.

More particularly, it is observed that semantic transformations can often be expressed as combination of transformations involving lookup in relational tables and other transformation such as syntactic transformations, number transformations, and so on. Given this, in the sections to follow, a semantic string lookup transformation language, which can be used to generate an inductive synthesis procedure that synthesizes a set of transformations involving lookup operations that are consistent with the given set of input-output examples, will be described. This will be followed by a description of a combination framework for combining the lookup transformation language and its synthesis procedure, with other transformation languages and their associated synthesis procedures. The resulting combined synthesis procedures enable the combination framework to synthesize transformations on a rich variety of data-types.

The inductive synthesis and combination framework technique embodiments described herein in general present a programming by example technology that allows end-users to automate repetitive tasks, such as converting spreadsheet input data into a prescribed output by simply providing one or more input-output examples. Thus, a tool is provided that is ready to be deployed for use by end-users in the real world.

1.1 String Transformation Expression Language and Inductive Synthesis Procedure A string transformation expression language L describes expressions e that map an input state $\sigma$, which holds values for m string variables $v_1, \ldots, v_m$ (for example, denoting the multiple input columns in a spreadsheet), to a single output string s, such that, $$e:(\text{String } x \ldots x \text{ String}) \rightarrow \text{String}$$

The above formalism can also be used for string processing tasks that require generating a tuple of n strings as an output by simply solving n independent problems.

An expression language L as defined for the purposes of the present disclosure is characterized by the following components:
1) A set of grammar rules R; and
2) A start symbol e, which is a uniquely distinguished nonterminal symbol occurring in R.

A synthesis procedure "Synthesize" for an expression language L learns the set of expressions in L that are consistent with a given set of input-output examples. The synthesis procedure is based on a framework characterized by following components:
1) A data-structure D for succinctly representing sets of expressions in language L. This is important because the number of expressions that are consistent with a given input-output example(s) may be huge and their explicit representation is not feasible in many cases. D itself is described using a set of grammar rules $\tilde{R}$ with start symbol $\tilde{e}$;
2) A "GenerateStr" or learning procedure for computing the set of expressions (represented using data-structure D) that are consistent with a given input-output example; and
3) An Intersect procedure for intersecting two sets of expressions (represented using data-structure D). The Intersect procedure is also described using a set of rules.

The synthesis procedure Synthesize involves invoking the GenerateStr procedure on each input-output example, and intersecting the results using the Intersect procedure as follows:

Synthesize(($\sigma_1, s_1$), ..., ($\sigma_n, s_n$))
1 P:=GenerateStr($\sigma_1, s_1$);
2 for i=2 to n:
3 P':=GenerateStr($\sigma_i, s_i$);
4 P:=Intersect(P, P');
5 return P;

It is noted that with regard to the GenerateStr procedure, it is defined to be sound and k-complete as follows. Let $\tilde{e}_t$=GenerateStr($\sigma$,s). GenerateStr is defined to be sound if:

$$\forall e_t \in [\![\tilde{e}_t]\!]:[\![e_t]\!]\sigma=s$$

GenerateStr is defined to be complete if $\tilde{e}_t$ includes all expressions that are consistent with the input-output example ($\sigma$,s), and GenerateStr is defined to be k-complete if $\tilde{e}_t$ includes all expressions of depth at most k that are consistent with the input-output example ($\sigma$,s).

With regard to the Intersect procedure, it is defined to be sound and complete as follows. Let $\tilde{e}''$=Intersect($\tilde{e},\tilde{e}'$). Intersect is defined to be sound and complete if $f[\![\tilde{e}'']\!]=[\![\tilde{e}]\!] \cap [\![\tilde{e}']\!]$.

1.2 Lookup Table Based String Transformations

String transformations often require access to real-world knowledge. In some cases, this knowledge can be modeled as relational tables (e.g., a function that maps telephone country codes numbers to country names). In many cases, this knowledge is already available in the form of existing spreadsheet tables, organizational databases, relational data available over the web, etc. A language $L_t$ for performing string transformations that require performing lookup operations in given relational tables will now be described.

1.2.1 Language $L_t$

The syntax of an expression language for lookup transformations over a given set of relational tables T is defined in one embodiment as follows:

Expression $e_t := v_i$

|Select(C,T,b)

Boolean Condition $b := p_1 \wedge \ldots \wedge p_n$

Predicate $p := C = s$

|$C = e_t$

In accordance with the foregoing syntax, an expression $e_t$ is either an input string variable $v_i$, or a select expression Select(C,T,b), where T is a table identifier and C is a column identifier within that table. The Boolean condition b is a conjunction of various predicates $p_1 \wedge \ldots \wedge p_n$ and is often treated as a set of predicates $\{p_1, \ldots, p_n\}$ for notational convenience. A predicate p is an equality comparison between the content of some column of some table with a constant or an expression. The symbol s denotes a string constant.

In addition, the semantics of this expression language for lookup transformations is defined in one embodiment as follows:

$$[\![s]\!]\sigma = s$$

$$[\![v_i]\!]\sigma = \sigma(v_i)$$

$$[\![\text{Select}(C, T, b)]\!]\sigma = \begin{cases} \text{Choose}(S) & \text{if } S \neq \text{Empty Set} \\ \epsilon & \text{if } S = \text{Empty Set} \end{cases}$$

where set S is the result of the relational algebra query "select C from T where b". It is noted that the notation Choose(S) is used to refer to non-deterministic selection of any element from S (in case S is not a singleton set).

1.2.2 Learning Procedure for $L_t$

1.2.2.1 Data Structure for Set of Expressions in $L_t$

The set of all expressions in language $L_t$ that are consistent with a given input-output example can be exponential in the size of the reference table T. This set can be represented succinctly using the data structure syntax and semantics described below. More particularly, the syntax of the data structure for lookup transformations is defined in one embodiment as follows:

$$\tilde{e}_t := (\tilde{\eta}_1, \tilde{\eta}_2, \text{Progs}) \text{ where Progs:}(\tilde{\eta}_1 \cup \tilde{\eta}_2) \to \tilde{f}$$

$$\tilde{f} := v_i | \text{Select}(C, T, \tilde{b})$$

$$\tilde{b} := (\{\beta_1\}_i, \beta)$$

$$\beta := q_1 \wedge \ldots \wedge q_n$$

$$q := C = s | C = \eta$$

Thus, the data structure consists of a tuple $(\tilde{\eta}_1, \tilde{\eta}_2, \text{Progs})$ where $\tilde{\eta}_1$ and $\tilde{\eta}_2$ are a set of nodes $\eta$, and Progs[$\eta$] represents a set of expressions from language $L_t$. Two aspects of this data structure are: (a) the use of temporary nodes $\tilde{\eta}_2$ to achieve sharing among different expressions (e.g., similar to use of extra variables during compilation to perform the optimization of common sub-expression elimination, except in this case done across different programs or expressions); and (b) exploiting the conjunctive normal form (CNF) of boolean conditions to represent a huge set $\tilde{b}$ of conditions by simply maintaining few minimal sets $\{\beta_i\}_i$ and the maximum set $\beta$.

The semantics of the data structure for lookup transformations is defined in one embodiment as follows:

$$[[\tilde{\eta}_1, \tilde{\eta}_2, \text{Progs}]] = \{e_t | e_t \in [[\text{Progs}[\eta]]], \eta \in \tilde{\eta}_1\}$$

$$[[v_i]] = \{v_i\}$$

$$[[\text{Select}(C,T,\tilde{b})]] = \{\text{Select}(C,T,b) | b \in [[\tilde{b}]]\}$$

$$[[\{\beta_i\}_i, \beta]] = \{p_1 \wedge \ldots \wedge p_n | p_j \in [[q_j]], \{q_j\}_j = \beta_i \cup \beta', \beta' \subseteq \beta\}$$

$$[[C=s]] = \{C=s\}$$

$$[[C=\eta]] = \{C=e_t | e_t \in [[\text{Progs}[\eta]]]\}$$

1.2.2.2 GenerateStr$_t$ Procedure

In one embodiment, the GenerateStr$_t$ procedure for lookup transformations is as follows:

```
GenerateStr_t (σ: Input state, s: Output string)
 1    η̃ := Empty Set; η̃_Old := Empty Set; steps := 0
 2    foreach input variable v_i:
 3        η := NewNode( ); η̃ := η̃ ∪ {η};
 4        Progs[η] := v_i; Id[η] := v_i;
 5    while (steps + + ≤ k ∧ η̃_Old ≠ η̃)
 6        η̃_diff := η̃ − η̃_Old; η̃_Old := η̃;
 7        foreach table T, col C, row r s. t.
              T[C, r] = val(η) for some η ∈ η̃_diff
 8        B := GenerateBool(η̃, T, r);
 9        foreach column C' of table T:
10            if ((η' := Id^−1 (T, C', r)) =⊥)
11            then η' := NewNode( ); η̃ := η̃ ∪ {η'};
12                 Id[η'] := (T, C', r);
13            Progs[η'] := Select(C', T, B);
14    η̃_1 := {η | η ∈ η̃, val(η) = s}; η̃_2 := η̃ − η̃_1;
15    return (η̃_1, η̃_2, Progs);
where,
GenerateBool(η̃: Nodes, T: Table, r: Row)
 1    β := {C = T[C, r] | C ∈ Columns(T)} ∪
            {C = η | T[C, r] = val(η), η ∈ η̃};
 2    B := {β' | β' is a minimal subset of β
               that identifies r in T};
 3    return (B, β);
and
```

$$\text{val}(\eta) \stackrel{def}{=} \begin{cases} \sigma(v_i) & \text{Id}[\eta] = v_i \\ T(C, r) & \text{Id}[\eta] = (T, C, r) \end{cases}$$

The GenerateStr$_t$ procedure operates by iteratively computing a set of nodes $\eta$ and updating two maps Progs and Id in the loop at Line 5. The map Id associates every node $\eta$ to its corresponding source, and is used to avoid generation of duplicate nodes corresponding to the same source (using the check at Line 10). Id[$\eta$] is either an input variable $v_i$ or some table cell (T,C,r). The helper function val($\eta$) converts every node to the corresponding string value. The map Progs associates every node $\eta$ to a set of expressions (of depth at most k steps), each of which evaluates to val($\eta$) on the input state $\sigma$. The purpose of each iteration of the loop at Line 5 is to perform an iterative forward reachability analysis of the string values that can be generated in a single step (i.e., using a single Select expression) from the string values computed in previous steps, with the base case being the values of the input string variables.

Each iteration of the loop at Line 5 results in consideration of expressions whose depth is one larger than the set of expressions considered in the previous step. The depth of the expressions in language $L_t$ can be as much as the total number of entries in all of the relational tables combined. Since it has not been observed that any intended program has a large depth in practice, the depth consideration is limited to a parameter k (which is set to 5 for in one tested embodiment) for efficiency reasons. One might be tempted to use the predicate (s∈{val ($\eta$)}|$\eta$∈$\tilde{\eta}$)∨($\tilde{\eta}_{Old}$=$\tilde{\eta}$) as a termination condition for the loop. However, this has two issues. One is that it may happen co-incidentally that the output s might be computable by a program of depth smaller than the depth of the intended program on a given example, and in that case the procedure would fail to discover the correct program. On the other hand, it might also happen that the intended program does not belong to the language $L_t$, in which case the search would fail, but possibly only after consideration of all expressions whose depth is as large as the total number of entries in all relational tables combined together.

The procedure GenerateBool($\tilde{\eta}$,T,r) generates the set of all boolean conditions q, each of which uniquely identifies row r in table T. In other words, the condition q is satisfied by row r of table T, but is not satisfied by any other row of table T. The set b computed at line 1 denotes the set of all predicates q that are satisfied by row r of table T.

1.2.2.3 Intersect$_t$ Procedure

In one embodiment, the Intersect$_t$ procedure for intersecting the sets of expressions computed by the GenerateStr$_t$ procedure is defined as follows:

$$\text{Intersect}_t((\tilde{\eta}_1,\tilde{\eta}_2,\text{Progs}),(\tilde{\eta}'_1,\tilde{\eta}'_2,\text{Progs}')) = (\tilde{\eta}_1 \times \tilde{\eta}'_1, \tilde{\eta}_2 \times \tilde{\eta}'_2, \text{Progs}'')$$

where $$\text{Progs}''(\langle\eta,\eta'\rangle) = \text{Intersect}_t(\text{Progs}[\eta],\text{Progs}'[\eta'])$$

$$\text{Intersect}_t(v_i,v_i) = v_i$$

$$\text{Intersect}_t(\text{Select}(C,T,\tilde{b}),\text{Select}(C,T,\tilde{b}')) = \text{Select}(C,T,\text{Intersect}_t(\tilde{b},\tilde{b}'))$$

$$\text{Intersect}_t((\{\beta_i\}_i,\beta),(\{\beta'_j\}_j,\beta')) = (B,\beta'')$$

where $$\beta'' = \{\text{Intersect}_t(q,q') | q\gamma\beta, q'\in\beta'\}$$

and B = $\{\beta_s | \beta_s$ is a minimal subset of $\beta''$, $$\text{Project}_1(\beta_s) \supseteq \beta_i, \text{Project}_2(\beta_s) \supseteq \beta'_j\}_{i,j}$$

$$\text{Intersect}_t(C=s,C=s) = C=s$$

$$\text{Intersect}_t(C=\eta,C=\eta') = C=\langle\eta,\eta'\rangle$$

$$\text{Project}_k(C=s) = C=s$$

$$\text{Project}_1(C=\langle\eta,\eta'\rangle) = C=\eta$$

$$\text{Project}_2(C=\langle\eta,\eta'\rangle) = C=\eta'$$

Note that the procedure GenerateStr$_t$ is sound and k-complete, and the procedure Intersect$_t$ is sound and complete.

1.2.3 Exemplary Process for Learning Lookup Table String Transformations

The foregoing aspects of the inductive synthesis and combination framework technique embodiments described herein can be realized in one general implementation outlined in FIG. 1. More particularly, a computer (such as any of the computing devices described in the Exemplary Operating Environments to follow) is used to perform string transformations involving lookup operations in one or more relational tables. This involves first establishing a relational table lookup expression language that includes a set of grammar rules defining expressions (process action 100). A synthesis procedure is then generated that learns a set of expressions in the relational table lookup expression language, which produce a prescribed output from one or more input string variables using the one or more relational tables, based on a set of one or more input-output examples (process action 102). As indicated previously, each of these input-output examples includes one or more input string variables and the prescribed output. One or more input string variables of a same type found in the set of one or more input-output examples is then received (process action 104), and the prescribed output is produced using the synthesis procedure (process action 106).

Figure 2:
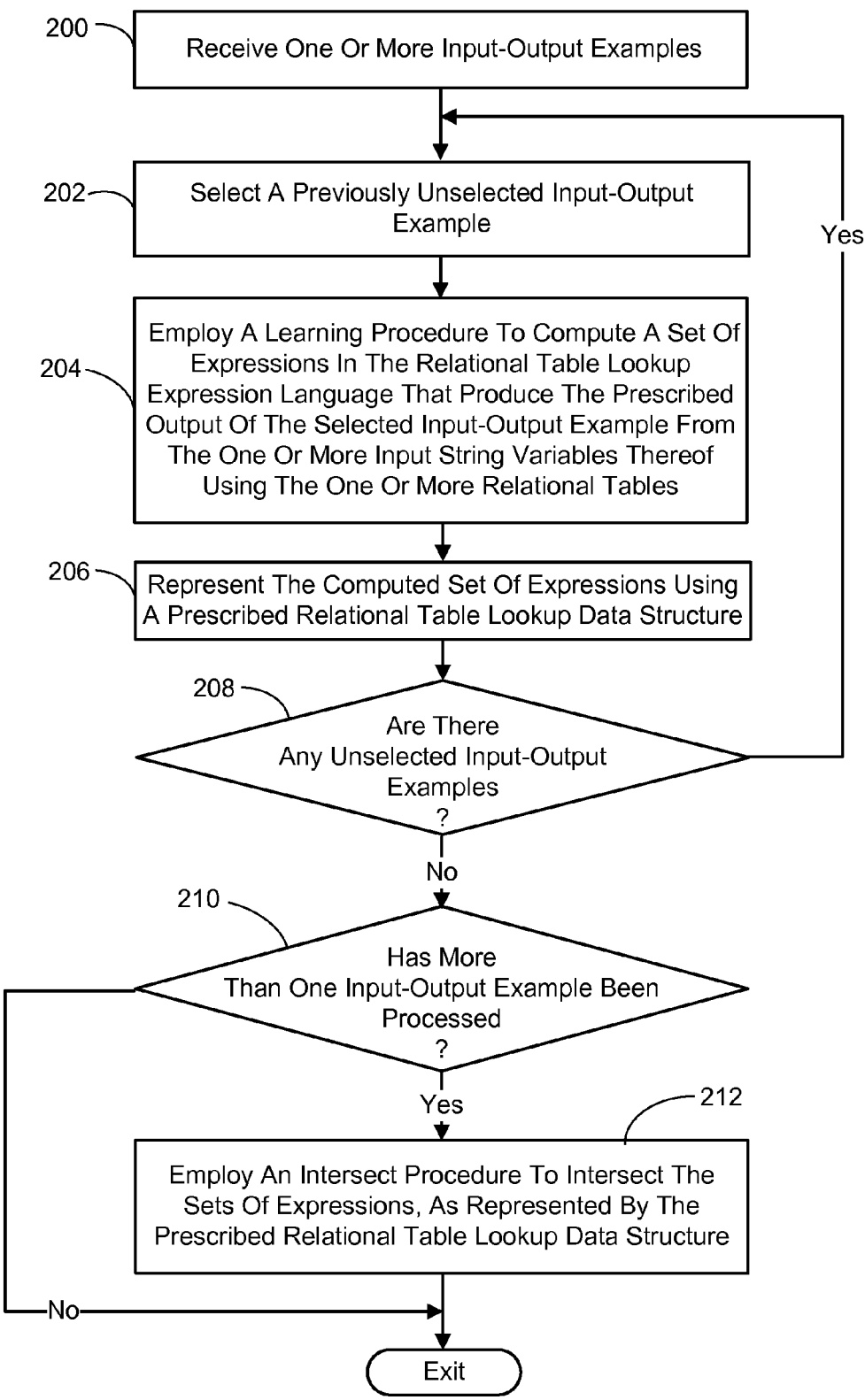
FIG. 2 is a flow diagram generally outlining an implementation of a part of the process of FIG. 1 involving the generation of the synthesis procedure.

With regard to generating the synthesis procedure in the foregoing process, in one implementation shown in FIG. 2, this involves receiving one or more input-output examples (process action 200), and selecting a previously unselected one of them (process action 202). A string generation procedure is then employed to compute a set of expressions in the relational table lookup expression language that produce the prescribed output of the input-output example from the one or more input string variables of the input-output example using the one or more relational tables (process action 204). The computed set of expressions is then represented using a prescribed relational table lookup data structure (process action 206). It is next determined if there are any additional input-output examples which have not been selected and processed (process action 208). If there is at least one additional input-output example, then process actions 202 through 208 are repeated until all the examples have been processed. When it is determined there are no additional input-output examples, it is determined if more than one input-output example has been processed (process action 210). If so, an intersect procedure is then employed to intersect the sets of expressions, as represented by the prescribed relational table lookup data structure (process action 212). Once the intersect procedure is complete, or if it was determined that only one input-output example was processed, the process ends. It is noted that the intersected sets of expressions are also represented by the prescribed relational table lookup data structure.

The aforementioned intersect procedure is employed to intersect the expressions generated from each input-output example by the string generation procedure (as exemplified by the previously described Intersect$_t$ procedure embodiment which intersect the expressions generated by the GenerateStr$_t$ procedure embodiment). Generally, the represented set of expressions and the intersected sets of expressions are intersected in pairs until a single, comprehensive intersected set of expressions is obtained. Thus, in view of the procedure outlined in FIG. 2, one way of accomplishing the intersecting is to intersect the expression sets in pairs to produce intersected sets, and then intersect pairs of the intersected sets until a single intersected set is produced. Other sequences can also be employed which involve intersecting an expression set with an intersected set.

Figure 3:
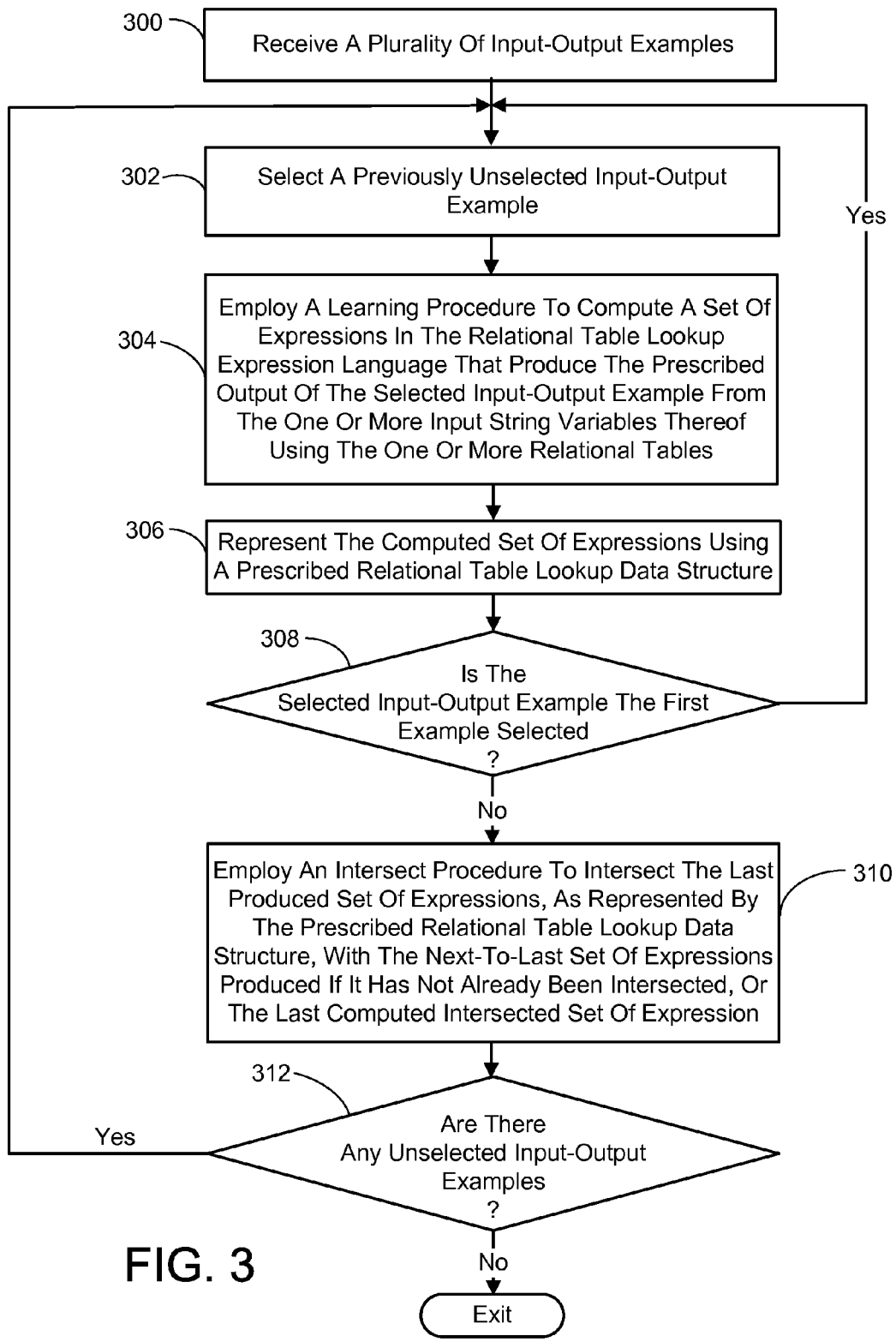
FIG. 3 is a flow diagram generally outlining an alternate implementation of the part of the process of FIG. 1 involving the generation of the synthesis procedure.

It is also possible to modify the process of FIG. 2, so that for each expression set produced after the first, it is intersected with the last produced expression set (if it is the second set produced), or with the last produced intersected set (if it is the third or greater set produced). This latter scenario assumes there are at least three input-output examples received. The alternate implementation of the process for generating the synthesis procedure is shown in FIG. 3. The alternate procedure addresses the latter scenario. More particularly, this process involves receiving a plurality of input-output examples (process action 300), and selecting a previously unselected one of them (process action 302). A string generation procedure is then employed to compute a set of expressions in the relational table lookup expression language that produce the prescribed output of the selected input-output example from the one or more input string variables of the selected example using the one or more relational tables (process action 304). The computed set of expressions is then represented using a prescribed relational table lookup data structure (process action 306). It is next determined if the selected input-output example is the first example selected (process action 308). If so, then process actions 302 through 308 are repeated. If not, then an intersect procedure is employed to intersect the last produced set of expressions, as represented by the prescribed relational table lookup data structure, with the next-to-last set of expressions produced (i.e., the set produced from the input-output example selected first) if it has not already been intersected, or the last computed intersected set of expression (process action 310). It is next determined if there are any additional input-output examples which have not been selected and processed (process action 312). If not, the procedure ends. However, if there is at least one additional input-output example, then process actions 302 through 312 are repeated until all the examples have been processed. It is noted that the intersected sets of expressions are also represented by the prescribed relational table lookup data structure.

1.2.4 Example Lookup Table String Transformation Scenario

The foregoing processes can be employed to learn a lookup table string transformation for the following scenario. The goal of this example is to output a cost value of an item from the item name and date in the input columns of a spreadsheet 400 shown in FIG. 4. The first row 402 of the FIG. 4 spreadsheet 400 represents the only input-output example. The bolded costs 404 shown in the other rows of the output column 406 represent the "looked-up" values. The lookup table MarkupRec (shown in FIG. 5) stores the item's name with its corresponding item-id and the lookup table CostRec (shown in FIG. 6) stores the price of the item (represented by item-id) on a given day.

The expression synthesized using the inductive synthesis and combination framework technique embodiments described herein is as follows:

$$\text{Select}(\text{Cost}, \text{CostRec}, \text{Date} = v_2 \wedge \text{Item-Id} = e_i,$$

where $e_i$=Select(Item-Id,MarkupRec,Item-Name=$v_1$))

1.3 Combination Framework

A combination framework will now be presented for combining the previously described lookup transformation language and its synthesis procedures, with other transformation languages and their associated synthesis procedures. More particularly, given the above-described language $L_t$, it is possible to construct a generic learning procedure for the combination of $L_t$ with any other string transformation language.

For example, but without limitation, the second expression language can be a number transformation expression language that performs formatting and rounding operations on numbers, or a syntactic transformation expression language that performs syntactic string transformations. Further, the second expression language can be a combined language itself. For instance, but without limitation, the second language can be a combined expression language that performs formatting and rounding operations on numbers as well as syntactic string transformations.

1.3.1 Combined Expression Language $L_t \oplus L_a$

Let $L_a$ be an expression language whose grammar consists of rules $R_a$ with start symbol $e_a$. Without loss of generality, it is assumed that the grammar rules of different languages do not share non-terminals.

In general, the combination of $L_t$ with another string transformation language $L_a$ produces a third language $L_t \oplus L_a$, whose expression grammar consists of rules $R_t \cup R_a$ along with the following new rules, and with e as the start symbol:

$$e_t := \text{let } u = e_a \text{ in } e_t$$

$$e_a := \text{let } u = e_t \text{ in } e_a$$

$$e := e_t | e_a$$

The semantics of the let rule is defined as:

$$[[\text{let } u = e_a \text{ in } e_t]]\sigma = [[e_t]]\sigma' \text{ where } \sigma' \stackrel{def}{=} \sigma[u \leftarrow [[e_a]]\sigma]$$

1.3.2 Synthesis Procedure for $L_t \oplus L_a$

It will now be shown how the synthesis procedure for language $L_t$ can be extended to a synthesis procedure for the combination language $L_t \oplus L_a$ where the synthesis procedure for $L_a$ is considered a black-box.

1.3.2.1 Data Structure for a Set of Expressions in $L_t \oplus L_a$

The data-structure for representing sets of expressions in language $L_t \oplus L_a$ consists of the union of rules $\tilde{R}_t$ and $\tilde{R}_a$ along with the following additional rules:

$$q := C = \tilde{e}_a$$

$$\tilde{e}_a := \text{let } u = \tilde{e}_t \text{ in } \tilde{e}_a$$

where the set of variables that occur in $\tilde{e}_a$ come from the set $\tilde{\eta}_2$.

The semantics of these rules are as follows:

$$[[C = \tilde{e}_a]] = \{C = (\text{let } u = e_a[\eta_i \leftarrow e_t^i]_i \text{ in } u) | e_a \in [[\tilde{e}_a]], e_t^i \in [[Progs(\eta_i)]]\}$$

$$[[\text{let } u = \tilde{e}_t \text{ in } \tilde{e}_a]] = \{\text{let } u = e_t \text{ in } e_a | e_t \in [[\tilde{e}_t]], e_a \in [[\tilde{e}_a]]\}$$

1.3.2.2 GenerateStr Procedure for $L_t \oplus L_a$

The GenerateStr procedure for language $L_t \oplus L_a$ consists of the following two generalizations to the GenerateStr$_t$ procedure of language $L_t$ described previously. Let s=T[C,r] and $\sigma$ be an input state that maps $\eta$ to val($\eta$) for all $\eta \in \eta_2$.

The condition "val($\eta$)=T[C,r]" at Line 7 in GenerateStr$_t$ is replaced by the condition "GenerateStr$_a$($\sigma$,s) contains any expression that uses a variable from $\tilde{\eta}_{diff}$". In addition, the following set is added to β at Line 1 in helper function GenerateBool: {C=GenerateStr$_a$($\sigma$, s)}.

1.3.2.3 Intersect Procedure for $L_t \oplus L_a$

The Intersect procedure here consists of the union of rules for the Intersect$_t$ procedure of language $L_t$, rules for Intersect$_a$ procedure of language $L_a$, and the following additional rules.

$$\text{Intersect}_t(\text{let } u = \tilde{e}_a \text{ in } f, \text{ let } u' = \tilde{e}'_a \text{ in } f) = \text{let } u = \text{Intersect}(\tilde{e}_a, \tilde{e}'_a) \text{ in } \text{Intersect}_t(f, f'[u/u'])$$

$$\text{Intersect}(\text{let } u = \tilde{e}_t \text{ in } \tilde{e}_a, \text{ let } u' = \tilde{e}'_t \text{ in } \tilde{e}'_a) = \text{let } u = \text{Intersect}_t(\tilde{e}_t, \tilde{e}'_t) \text{ in } \text{Intersect}(\tilde{e}_a, \tilde{e}'_a[u/u'])$$

Figure 7:
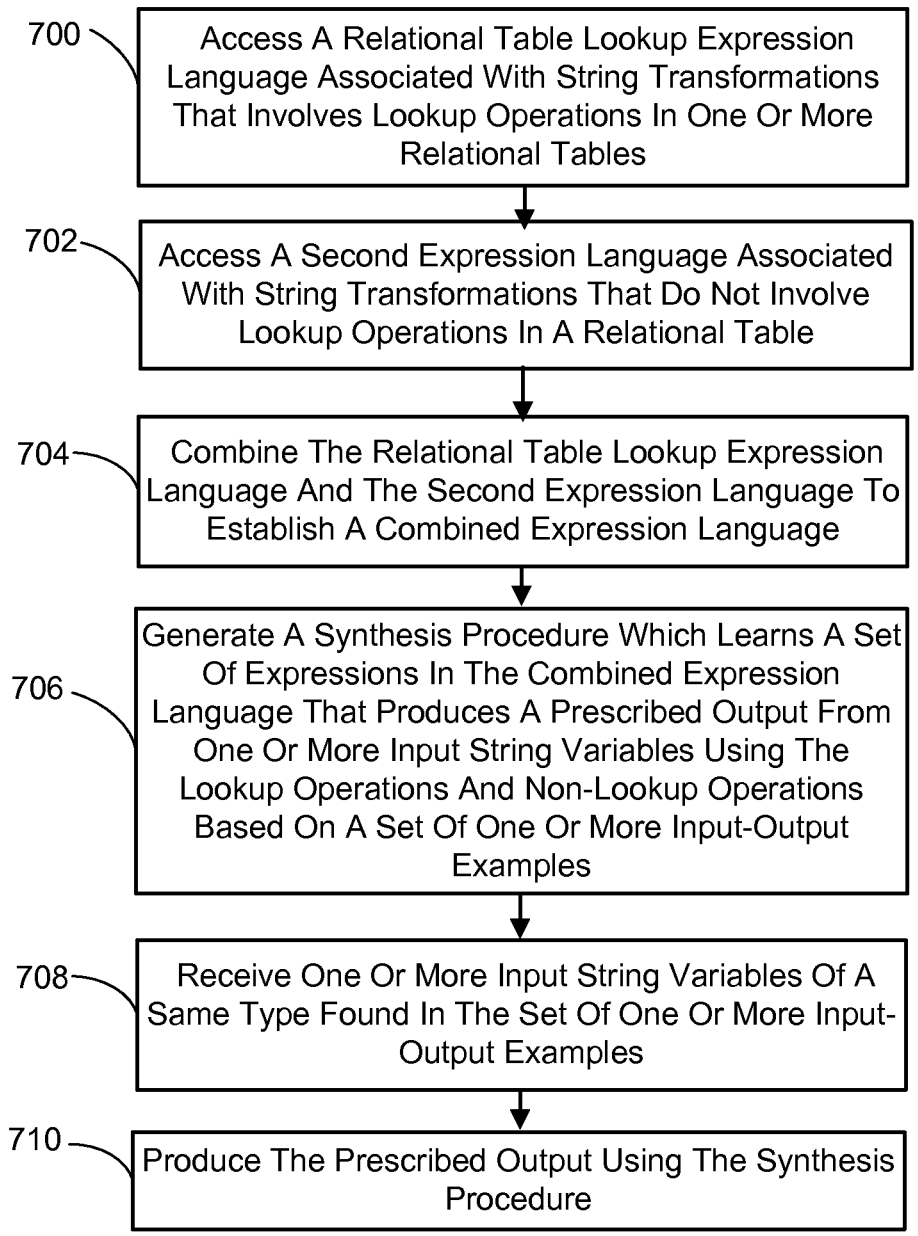
FIG. 7 is a flow diagram generally outlining one embodiment of a process for combining the lookup transformation language and its synthesis procedure, with other transformation languages and their associated synthesis procedures.

1.3.3 Exemplary Process for Performing Combining Lookup Table String Transformations with Other String Transformations The foregoing combination aspects of the inductive synthesis and combination framework technique embodiments described herein can be realized in one general implementation outlined in FIG. 7. More particularly, a computer (such as any of the computing devices described in the Exemplary Operating Environments to follow) is used to perform string transformations involving lookup operations in one or more relational tables and other non-lookup operations. This involves first accessing a relational table lookup expression language associated with string transformations that involve lookup operations in one or more relational tables (process action 700), and accessing a second expression language associated with string transformations that do not involve lookup operations (process action 702). The relational table lookup expression language and the second expression language are then combined to establish a combined expression language (process action 704). Next, a synthesis procedure is generated which learns a set of expressions in the combined expression language that produces a prescribed output from one or more input string variables using the lookup operations and non-lookup operations based on a set of one or more input-output examples (process action 706). One or more input string variables of a same type found in the set of input-output examples are then received (process action 708), and the prescribed output is produced using the synthesis procedure (process action 710).

With regard to combining the relational table lookup expression language and the second expression language to establish a combined expression language in the foregoing process, in one implementation, this involves combining a first set of grammar rules associated with the relational table lookup expression language and a second set of grammar rules associated with the second expression language without repeating any of the rules. In addition, whenever an expression in the relational table lookup expression language also involves a non-lookup operation, a second expression language expression corresponding to the non-lookup operation is included in the relational table lookup language expression. And, whenever an expression in the second expression language also involves a lookup operation, a relational table lookup language expression corresponding to the lookup operation is included in the second language expression.

It is further noted that the synthesis procedure for the combined expression language is generated in the same way as described previously in connection with the relational table lookup language. The only exceptions are the few additions and substitutions identified above for the data structure, GenerateStr procedure and Intersect procedure employed with the $L_t \oplus L_a$ language.

1.3.4 Example Combined Lookup Table String Transformation and Other Transformations Scenario The foregoing processes can be employed to learn a combined lookup table string transformation and other transformations for the following scenario. In this case the other transformations involved a combined expression language directed to rounding numbers and syntactic operations. The goal of this example is to perform a set of currency conversion tasks for reimbursement purposes that inputs the number of dollars or other currency to be converted, the type of currency the money to be converted into and the date of the conversion. These inputs ($v_1$, $v_2$, $v_3$) are provided in the first three columns 802, 804, 806, respectively, of the spreadsheet 800 shown in FIG. 8. The first two rows 808, 810 of the spreadsheet 800 also include a desired output in the output column 812, and represent a pair of input-output examples. The desired output represents the conversion rate existing on the specified input date rounded to two decimal places and the number of dollars or other currency specified in the input, separated by the symbol "*". Thus, with regard to the first input-output example, it is desired to convert 10 US dollars (USD) into its corresponding euro (EUR) value using the conversion rate existing (rounded to two decimal places) on the date 2010-05-24 (i.e., May 24, 2010). The rates are looked up from a large currency conversion table CurrTab comprising the exchange rates for different currencies for last 10 years—a representative portion of which is shown in FIG. 9. In the case of the first input-output example, the USD-EUR conversion rate corresponding to the specified date according to the CurrTab table is 0.8202. Thus the desired output as specified in the first input-output example is "0.82*10".

The inductive synthesis and combination framework technique embodiments described herein can be used to generate a synthesis procedure to produce the desired output (shown in bold in the output column of the last four rows of the FIG. 8 spreadsheet) from the inputs provided in the FIG. 8 spreadsheet based on the pair of input-output examples also provided.

The desired transformation is synthesized as a combination of syntactic transformation, lookup transformation over the provided currency conversion table, and number transformation for rounding off the currency conversion rate to two decimal digits. The desired transformation can be expressed in a combined expression language $L_t \oplus L_a$ (where $L_a$ is a given combined number and syntactic transformation language) as follows:

Concatenate(Round1($u$,0,0.01,$\updownarrow$),ConstStr("*"),SubStr2($v_1$,NumTok,1))

where
  u≡Select(ExRate,CurrTab,[b∧Dst=$v_2$∧Date=$v_3$]) and
  b≡(Src=SubStr2($v_1$,alphaTok,1))

Note that the Concatenate expression comes from the combined number and syntactic transformation language $L_a$ where the first term rounds the number "u" to two decimal places, the second term introduces the symbol "*", and the third term parses the number portion (NumTok) of the $v_1$ input. The number u is the conversion rate looked-up in the CurrTab table, and is defined by the embedded $L_t$ language expression "Select(ExRate, CurrTab, [b∧Dst=$v_2$∧Date=$v_3$])". This expression selects the number in the ExRate column (C) of the CurrTab table (T), that satisfy the conditions (q) specified as "[b∧Dst=$v_2$∧Date=$v_3$]". Note that b refers to an embedded combined number and syntactic transformation language $L_a$ expression defined as "(Src=SubStr2($v_1$,alphaTok,1))", which parses the text portion (alphaTok) of the $v_1$ input.

2.0 Exemplary Operating Environments

Figure 10:
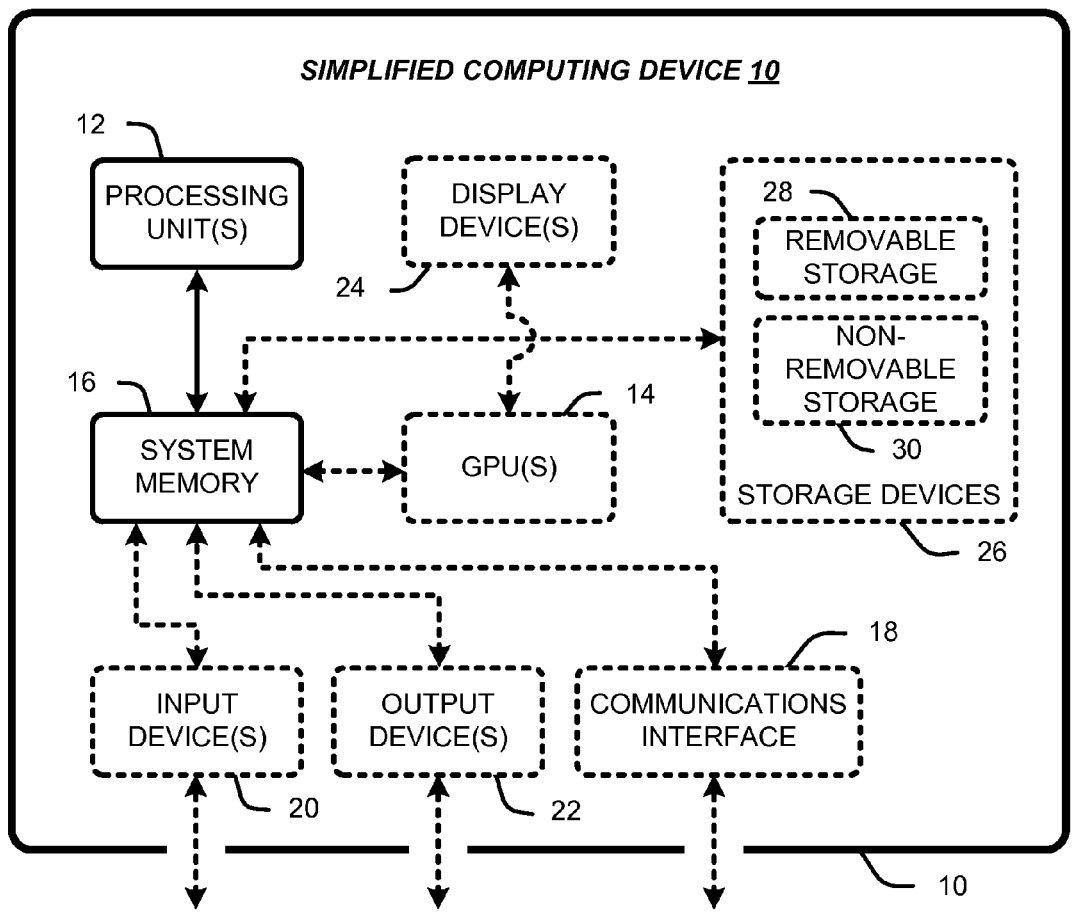
FIG. 10 is a diagram depicting a general purpose computing device constituting an exemplary system for implementing inductive synthesis and combination framework technique embodiments described herein.

The inductive synthesis and combination framework technique embodiments described herein are operational within numerous types of general purpose or special purpose computing system environments or configurations. FIG. 10 illustrates a simplified example of a general-purpose computer system on which various embodiments and elements of the inductive synthesis and combination framework technique embodiments, as described herein, may be implemented. It should be noted that any boxes that are represented by broken or dashed lines in FIG. 10 represent alternate embodiments of the simplified computing device, and that any or all of these alternate embodiments, as described below, may be used in combination with other alternate embodiments that are described throughout this document.

For example, FIG. 10 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the inductive synthesis and combination framework technique embodiments described herein, the device should have a sufficient computational capability and system memory to enable basic computational operations. In particular, as illustrated by FIG. 10, the computational capability is generally illustrated by one or more processing unit(s) 12, and may also include one or more GPUs 14, either or both in communication with system memory 16. Note that that the processing unit(s) 12 of the general computing device may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 10 may also include other components, such as, for example, a communications interface 18. The simplified computing device of FIG. 10 may also include one or more conventional computer input devices 20 (e.g., pointing devices, keyboards, audio input devices, video input devices, haptic input devices, devices for receiving wired or wireless data transmissions, etc.). The simplified computing device of FIG. 10 may also include other optional components, such as, for example, one or more conventional display device(s) 24 and other computer output devices 22 (e.g., audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 10 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying some or all of the various inductive synthesis and combination framework technique embodiments described herein, or portions thereof, may be stored, received, transmitted, or read from any desired combination of computer or machine readable media or storage devices and communication media in the form of computer executable instructions or other data structures.

Finally, the inductive synthesis and combination framework technique embodiments described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

3.0 Other Embodiments

The combination framework described previously was employed to combining the previously described lookup transformation language and its synthesis procedures with other transformation languages and their associated synthesis procedures. However, it is noted that in general any expression language and its synthesis procedures can be combined with another transformation language using the combination framework by employing the same procedures as described in connection with combining the lookup transformation language with another language.

It is further noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for performing string transformations involving lookup operations in one or more relational tables, comprising:
using a computer to perform the following process actions:
establishing a relational table lookup expression language comprising a set of grammar rules defining expressions;
generating a synthesis procedure which learns a set of expressions in the relational table lookup expression language that produces a prescribed output from one or more input string variables using said one or more relational tables based on a set of one or more input-output examples each comprising one or more input string variables and said prescribed output; and
receiving one or more input string variables of a same type found in the set of one or more input-output examples, and producing the prescribed output using the synthesis procedure.

2. The process of claim 1, wherein the process action of generating a synthesis procedure, comprises the actions of:
for each input-output example separately,
employing a learning procedure to compute a set of expressions in the relational table lookup expression language that produce the prescribed output of the input-output example from the one or more input string variables of the input-output example using said one or more relational tables, and
representing the computed set of expressions using a prescribed relational table lookup data structure; and
whenever there are two or more input-output examples, employing an intersect procedure to intersect the sets of expressions, as represented by the prescribed relational table lookup data structure, computed using the input-output examples, wherein the intersected sets of expressions are also represented by the prescribed relational table lookup data structure.

3. The process of claim 2, wherein the process action of employing an intersect procedure to intersect the sets of expressions, as represented by the prescribed relational table lookup data structure, computed using the input-output examples whenever there are two or more input-output examples, comprises an action of intersecting the represented set of expressions and the intersected sets of expressions in pairs until a single, comprehensive intersected set of expressions is obtained.

4. The process of claim 1, wherein there are a plurality of input-output example, and wherein the process action of generating a synthesis procedure, comprises the actions of:
(a) selecting a previously unselected input-output example;
(b) employing a learning procedure to compute a set of expressions in the relational table lookup expression language that produce the prescribed output of the currently selected input-output example from the one or more input string variables of the currently selected input-output example using said one or more relational tables;
(c) representing the computed set of expressions using a prescribed relational table lookup data structure;
(d) repeating actions (a) through (c) to produce another computed set of expressions represented using the prescribed relational table lookup data structure;
(e) employing an intersect procedure to intersect the computed sets of expressions, as represented by the prescribed relational table lookup data structure, wherein the resulting intersected sets of expressions are also represented by the prescribed relational table lookup data structure;
(f) determining if there is at least one previously unselected input-output example remaining;
(g) wherever it is determined that there is at least one previously unselected input-output example remaining, repeating actions (a) through (c) to produce another computed set of expressions represented using the prescribed relational table lookup data structure, employing said intersect procedure to intersect the last computed set of expressions, as represented by the prescribed relational table lookup data structure, with the last produced intersected sets of expressions, wherein the resulting intersected sets of expressions are also represented by the prescribed relational table lookup data structure; and (h) repeating actions (f) and (g) until there are no more previously unselected input-output example remaining.

5. A computer-implemented process for performing string transformations involving at least two different operations, comprising:

using a computer to perform the following process actions:

accessing a first expression language associated with string transformations that involve a first operation, said first expression language comprising a first set of grammar rules defining expressions therein;

accessing a second expression language associated with string transformations that involve at least one operation that is different from said first operation, said second expression language comprising a second set of grammar rules defining expressions therein;

combining the first expression language and the second expression language to establish a combined expression language;

generating a synthesis procedure which learns a set of expressions in the combined expression language that produces a prescribed output from one or more input string variables using said at least two different operations based on a set of one or more input-output examples each comprising one or more input string variables and said prescribed output; and receiving one or more input string variables of a same type found in the set of one or more input-output examples, and producing the prescribed output using the synthesis procedure.

6. The process of claim 5, wherein the process action of combining the first expression language and the second expression language to establish a combined expression language, comprises the actions of:

combining the first and second sets of grammar rules without repeating any of the rules; and whenever an expression in the first expression language additionally involves at least one operation that is different from said first operation, including a second expression language expression corresponding to the at least one operation that is different from said first operation in the first language expression; and whenever an expression in the second expression language additionally involves said first operation, including a first expression language expression corresponding to said first operation in the second language expression.

7. The process of claim 5, wherein the process action of generating a synthesis procedure, comprises the actions of:

for each input-output example separately, employing a learning procedure to compute a set of expressions in the combined expression language that produce the prescribed output of the input-output example from the one or more input string variables of the input-output example using said first operation and said at least one operation that is different from said first operation, and representing the computed set of expressions using a prescribed combined expression language data structure; and whenever there are two or more input-output examples, employing an intersect procedure to intersect the sets of expressions, as represented by the prescribed combined expression language data structure, computed using the input-output examples, wherein the intersected sets of expressions are also represented by the prescribed combined expression language data structure.

8. The process of claim 7, wherein the process action of employing an intersect procedure to intersect the sets of expressions, as represented by the prescribed combined expression language data structure, computed using the input-output examples whenever there are two or more input-output examples, comprises an action of intersecting the represented set of expressions and the intersected sets of expressions in pairs until a single, comprehensive intersected set of expressions is obtained.

9. The process of claim 5, wherein there are a plurality of input-output example, and wherein the process action of generating a synthesis procedure, comprises the actions of:

(a) selecting a previously unselected input-output example;

(b) employing a string generation procedure to compute a set of expressions in the combined expression language that produce the prescribed output of the currently selected input-output example from the one or more input string variables of the currently selected input-output example using said first operation and said at least one operation that is different from said first operation;

(c) representing the computed set of expressions using a prescribed combined expression language data structure;

(d) repeating actions (a) through (c) to produce another computed set of expressions represented using the prescribed combined expression language data structure;

(e) employing an intersect procedure to intersect the computed sets of expressions, as represented by the prescribed combined expression language data structure, wherein the resulting intersected sets of expressions are also represented by the prescribed combined expression language data structure;

(f) determining if there is at least one previously unselected input-output example remaining;

(g) wherever it is determined that there is at least one previously unselected input-output example remaining, repeating actions (a) through (c) to produce another computed set of expressions represented using the prescribed combined expression language data structure, employing said intersect procedure to intersect the last computed set of expressions, as represented by the prescribed combined expression language data structure, with the last produced intersected sets of expressions, wherein the resulting intersected sets of expressions are also represented by the prescribed combined expression language data structure; and (h) repeating actions (f) and (g) until there are no more previously unselected input-output example remaining.

10. The process of claim 5, wherein the process action of accessing a second expression language, comprise an action of accessing a second expression language that is a combined expression language which performs more than one type of string transformation operation that is different from said first operation.

11. The process of claim 10, wherein the process action of accessing the first expression language associated with string transformations that involve a first operation, comprises accessing a relational table lookup expression language associated with string transformations that involve lookup operations in one or more relational tables, and wherein the process action of accessing the second expression language that is a combined expression language which performs more than one type of string transformation operation, comprises accessing a second expression language that is a combined expression language which performs formatting and rounding operations on numbers as well as syntactic string transformations.

12. A computer-implemented process for performing string transformations involving lookup operations in one or more relational tables and other non-lookup operations, comprising:

using a computer to perform the following process actions:

accessing a relational table lookup expression language associated with string transformations that involve lookup operations in one or more relational tables, said relational table lookup expression language comprising a first set of grammar rules defining expressions therein;

accessing a second expression language associated with string transformations that do not involve lookup operations in a relational table, said second expression language comprising a second set of grammar rules defining expressions therein;

combining the relational table lookup expression language and the second expression language to establish a combined expression language;

generating a synthesis procedure which learns a set of expressions in the combined expression language that produces a prescribed output from one or more input string variables using said lookup operations and non-lookup operations based on a set of one or more input-output examples each comprising one or more input string variables and said prescribed output; and receiving one or more input string variables of a same type found in the set of one or more input-output examples, and producing the prescribed output using the synthesis procedure.

13. The process of claim 12, wherein the process action of combining the relational table lookup expression language and the second expression language to establish a combined expression language, comprises the actions of:

combining the first and second sets of grammar rules without repeating any of the rules; and whenever an expression in the relational table lookup expression language additionally involves a non-lookup operation, including a second expression language expression corresponding to the non-lookup operation in the relational table lookup language expression; and whenever an expression in the second expression language additionally involves a lookup operation, including a relational table lookup language expression corresponding to the lookup operation in the second language expression.

14. The process of claim 12, wherein the process action of generating a synthesis procedure, comprises the actions of:

for each input-output example separately, employing a learning procedure to compute a set of expressions in the combined expression language that produce the prescribed output of the input-output example from the one or more input string variables of the input-output example using said lookup operations and non-lookup operations, and representing the computed set of expressions using a prescribed combined expression language data structure; and whenever there are two or more input-output examples, employing an intersect procedure to intersect the sets of expressions, as represented by the prescribed combined expression language data structure, computed using the input-output examples, wherein the intersected sets of expressions are also represented by the prescribed combined expression language data structure.

15. The process of claim 14, wherein the process action of employing an intersect procedure to intersect the sets of expressions, as represented by the prescribed combined expression language data structure, computed using the input-output examples whenever there are two or more input-output examples, comprises an action of intersecting the represented set of expressions and the intersected sets of expressions in pairs until a single, comprehensive intersected set of expressions is obtained.

16. The process of claim 12, wherein there are a plurality of input-output example, and wherein the process action of generating a synthesis procedure, comprises the actions of:

(a) selecting a previously unselected input-output example;

(b) employing a learning procedure to compute a set of expressions in the combined expression language that produce the prescribed output of the currently selected input-output example from the one or more input string variables of the currently selected input-output example using said lookup operations and non-lookup operations;

(c) representing the computed set of expressions using a prescribed combined expression language data structure;

(d) repeating actions (a) through (c) to produce another computed set of expressions represented using the prescribed combined expression language data structure;

(e) employing an intersect procedure to intersect the computed sets of expressions, as represented by the prescribed combined expression language data structure, wherein the resulting intersected sets of expressions are also represented by the prescribed combined expression language data structure;

(f) determining if there is at least one previously unselected input-output example remaining;

(g) wherever it is determined that there is at least one previously unselected input-output example remaining, repeating actions (a) through (c) to produce another computed set of expressions represented using the prescribed combined expression language data structure, employing said intersect procedure to intersect the last computed set of expressions, as represented by the prescribed combined expression language data structure, with the last produced intersected sets of expressions, wherein the resulting intersected sets of expressions are also represented by the prescribed combined expression language data structure; and (h) repeating actions (f) and (g) until there are no more previously unselected input-output example remaining.

17. The process of claim 12, wherein the process action of accessing a second expression language, comprise an action of accessing a second expression language that is a number transformation expression language which performs formatting and rounding operations on numbers.

18. The process of claim 12, wherein the process action of accessing a second expression language, comprise an action of accessing a second expression language that is a syntactic transformation expression language which performs syntactic string transformations.

19. The process of claim 12, wherein the process action of accessing a second expression language, comprise an action of accessing a second expression language that is a combined expression language which performs more than one type of non-lookup string transformation operations.

20. The process of claim 19, wherein the process action of accessing a second expression language that is a combined expression language which performs more than one type of non-lookup string transformation operations, comprises accessing a second expression language that is a combined expression language which performs formatting and rounding operations on numbers as well as syntactic string transformations.

\* \* \* \* \*